US008820690B2

(12) United States Patent
Weber (10) Patent No.: US 8,820,690 B2
(45) Date of Patent: Sep. 2, 2014

(54) FORCE SPREADING CLAMP

(75) Inventor: Timothy Scott Weber, Audubon, PA (US)

(73) Assignee: Streamlight, Inc., Eagleville, PA (US)

( * ) Notice: Subject to any disclaimer, the term of this patent is extended or adjusted under 35 U.S.C. 154(b) by 97 days.

(21) Appl. No.: 13/540,804

(22) Filed: Jul. 3, 2012

(65) Prior Publication Data

US 2014/0008508 A1 Jan. 9, 2014

(51) Int. Cl.
*A47B 96/06* (2006.01)
*F21V 21/088* (2006.01)
*A42B 3/04* (2006.01)

(52) U.S. Cl.
CPC ............ *F21V 21/0885* (2013.01); *A42B 3/044* (2013.01)
USPC ................ 248/229.15; 248/315; 248/231.71; 362/191

(58) Field of Classification Search
CPC ...... A42B 3/044; A42B 3/0443; A42B 1/244; F21V 21/0885
USPC ............ 248/62, 71, 74.1, 229.15, 230.1, 314, 248/315; 361/191
See application file for complete search history.

(56) References Cited

U.S. PATENT DOCUMENTS

| | | | |
|---|---|---|---|
| 273,857 A * | 3/1883 | Kirk .............................. 248/207 |
| 1,109,962 A * | 9/1914 | Chadwick ....................... 248/56 |
| 2,601,613 A * | 6/1952 | Jahncke .................... 248/229.15 |
| 3,526,381 A * | 9/1970 | Pepe ............................... 248/71 |
| 5,103,384 A * | 4/1992 | Drohan ........................ 362/191 |
| 5,108,055 A * | 4/1992 | Kreinberg et al. ............... 248/71 |
| 5,438,494 A | 8/1995 | Harlan |
| 5,608,919 A | 3/1997 | Case |
| 5,658,065 A | 8/1997 | Jamieson |
| 5,664,868 A | 9/1997 | Montalbano et al. |
| 6,206,543 B1 | 3/2001 | Henry |
| 6,616,294 B1 | 9/2003 | Henry |
| 7,073,755 B2 * | 7/2006 | Michaud et al. ................ 248/72 |
| 7,111,965 B2 * | 9/2006 | Hsu ............................... 362/396 |
| 7,156,536 B1 | 1/2007 | McCorkle |
| 7,677,755 B2 * | 3/2010 | Kim .............................. 362/190 |
| 8,226,057 B2 * | 7/2012 | Ao et al. ..................... 248/218.4 |
| 8,348,449 B2 * | 1/2013 | McCorkle et al. ............. 362/106 |
| 8,413,933 B2 * | 4/2013 | Benne et al. ..................... 248/62 |
| 2005/0254238 A1* | 11/2005 | Parker et al. .................. 362/191 |
| 2010/0084520 A1* | 4/2010 | Ohno ............................ 248/74.1 |

* cited by examiner

*Primary Examiner* — Gwendolyn W Baxter
(74) *Attorney, Agent, or Firm* — Drinker Biddle & Reath LLP (57) ABSTRACT

A force-spreading clamp including a tubular body having a longitudinal opening for receiving at least a portion of a generally cylindrical object and a wall encircling the longitudinal opening, a gate including a clamping member positioned within the longitudinal opening and having a contact wall for distributing clamping force along a surface of a generally cylindrical object, a guide mechanism being configured to maintain alignment between the gate and the tubular body, and an actuator configured to actuate the gate in a radially inward direction with respect to the tubular body wall to cause the clamping member to apply clamping force to a generally cylindrical object.

15 Claims, 8 Drawing Sheets

FORCE SPREADING CLAMP

BACKGROUND

In many industrial, public safety, and recreational applications, it is often necessary or desirable to mount generally cylindrical tools or other objects to a helmet or other mounting surface to facilitate hands-free operation. Such generally cylindrical objects include, but are not limited to, flashlights of varying sizes or circumferences and made of different materials. It is often desirable to Mount flashlights to helmets or other headgear, so that as the wearer moves his or her head, the flashlight always projects light where the wearer is directing his or her vision. Conventional helmet mounting devices for lights or other objects can range from simple elastic bands to metal mounting devices. However, many such devices are limited in their ability to receive multi-sized objects and do not take into consideration the susceptibility of the outer surface of the objects to penetration or damage from the mounting devices themselves.

In particular, many conventional mounting devices utilize set screws that can dig into, mar, penetrate, and crack the body of a generally cylindrical object being mounted due to the softness of the material from which the objects are manufactured. This may be especially problematic for objects, such as flashlights, for which the integrity of the object's body is essential to maintain the safe use of the object, for example to isolate the internal electrical components of a flashlight from an explosive ambient environment. In order to achieve certain safety ratings for the use of a flashlight as a tool in potentially hazardous settings, a flashlight must meet several stringent specifications. Generally, the highest safety ratings require that a flashlight be made so that it is safe to operate in the presence of flammable gasses, liquids, or vapors. If the body of the flashlight were susceptible to static electricity, then it might become an ignition source in certain hazardous conditions. Materials have been identified which prevent this from happening, thereby allowing the flashlight to achieve an intrinsically safe rating. However, a problem often arises in that the materials that prevent static electricity in a hazardous setting also are soft and therefore susceptible to puncture or breach when a set screw is applied to mount a flashlight to a mounting surface.

SUMMARY

A force-spreading clamp as disclosed herein spreads the clamping force exerted upon a generally cylindrical object, such as a flashlight, along an axial portion of the object in order to prevent a set screw or other more common clamp mechanism from penetrating or otherwise damaging the outer surface of the object. In addition to spreading the clamping force, the disclosed clamp is capable of tightly and securely holding generally cylindrical objects of a different sizes and shapes whose circumferences fit within the opening of the body of the clamp so as to prevent slippage. The force spreading mechanism acts as a pressure plate to effectively decrease or enlarge the diameter of the opening, thereby allowing the clamp to accept objects of varying circumferences.

An embodiment of a force-spreading clamp is described including a tubular body, a gate, and an actuator. The tubular body has a longitudinal opening for receiving at least a portion of a generally cylindrical object and a wall encircling the longitudinal opening. The wall includes a gate wall portion having guide holes and a mounting wall portion, the gate wall portion and the mounting wall portion being joined by a pair of side portions, the gate wall portion surrounding a recess in the longitudinal opening. The gate includes a longitudinal clamping member having an outer wall and an inner contact wall for distributing clamping force along an outer surface of a generally cylindrical object so as to inhibit damage to the object. The gate is movable with respect to the body to enable the clamping member to be extended radially inward into the longitudinally opening and to be retracted radially outwardly to be positioned at least partially within the recess in the longitudinal opening. The gate further includes a pair of guide elements protruding from the outer wall of the clamping member and extending through the guide holes in the gate wall portion to maintain alignment between the gate and the tubular body as the gate is moved radially inwardly and outwardly. The actuator threadingly engages the gate wall portion of the tubular body wall such that rotating the actuator in a first direction with respect to the tubular body actuates the gate in a radially inward direction from the tubular body wall to cause the clamping member to increase a clamping force applied to a generally cylindrical object and rotating the actuator in a second direction causes the clamping member to decrease the clamping force applied to a generally cylindrical object.

In another embodiment, a force-spreading clamp is described including a tubular body, a gate, a guide mechanism, and an actuator. The tubular body has a longitudinal opening for receiving at least a portion of a generally cylindrical object and a wall encircling the longitudinal opening. The gate includes a clamping member positioned within the longitudinal opening and having a contact wall for distributing clamping force along a surface of a generally cylindrical object. The guide mechanism is configured to maintain alignment between the gate and the tubular body as the gate moves radially inward and outward with respect to the tubular body wall. The actuator is configured to actuate the gate in a radially inward direction with respect to the tubular body wall to cause the clamping member to apply clamping force to a generally cylindrical object.

In another embodiment, a force-spreading clamp is described for retaining a generally cylindrical object. The clamp includes a body, a movable gate, at least one guide element, and a set screw. The body has an axial opening therethrough for receiving at least a portion of a generally cylindrical object. The movable gate clement extends radially into the opening and has a contact face and a force-receiving face opposite the contact face, the gate element being movable toward and away from the longitudinal axis of the opening. The at least one guide clement extends from the force-receiving face of the contact clement and through a guide opening in the body. The set screw threadingly engages the body and has a first end contacting the force-receiving face of the contact element, and is operative to regulate movement of the engaging clement toward and away from the longitudinal axis oldie body. Rotation of the set screw in a first rotational sense causes the contact element to contact and apply clamping force to a generally cylindrical object in the opening to retain the object in the opening, the clamping pressure being approximately evenly distributed across the surface area of the contact face.

DETAILED DESCRIPTION

Figure 1:
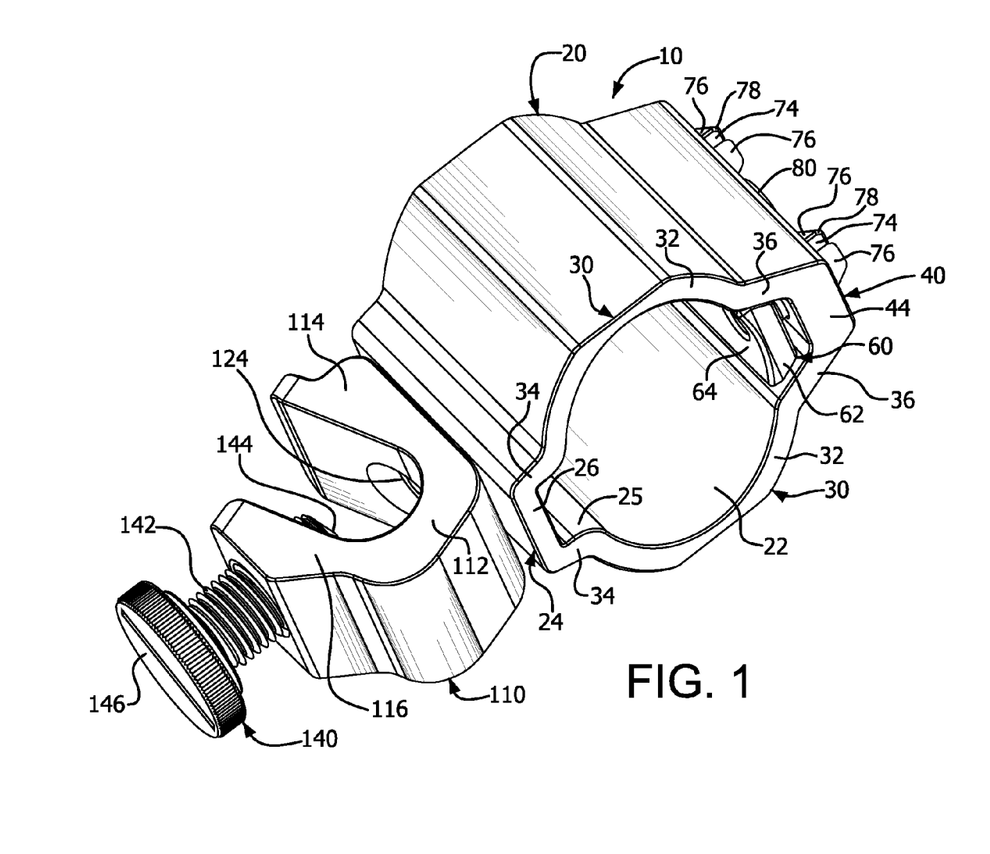
FIG. 1 is a perspective view of an embodiment of a force spreading clamp for securing a generally cylindrical object to a mounting surface or to another object.
Figure 7:
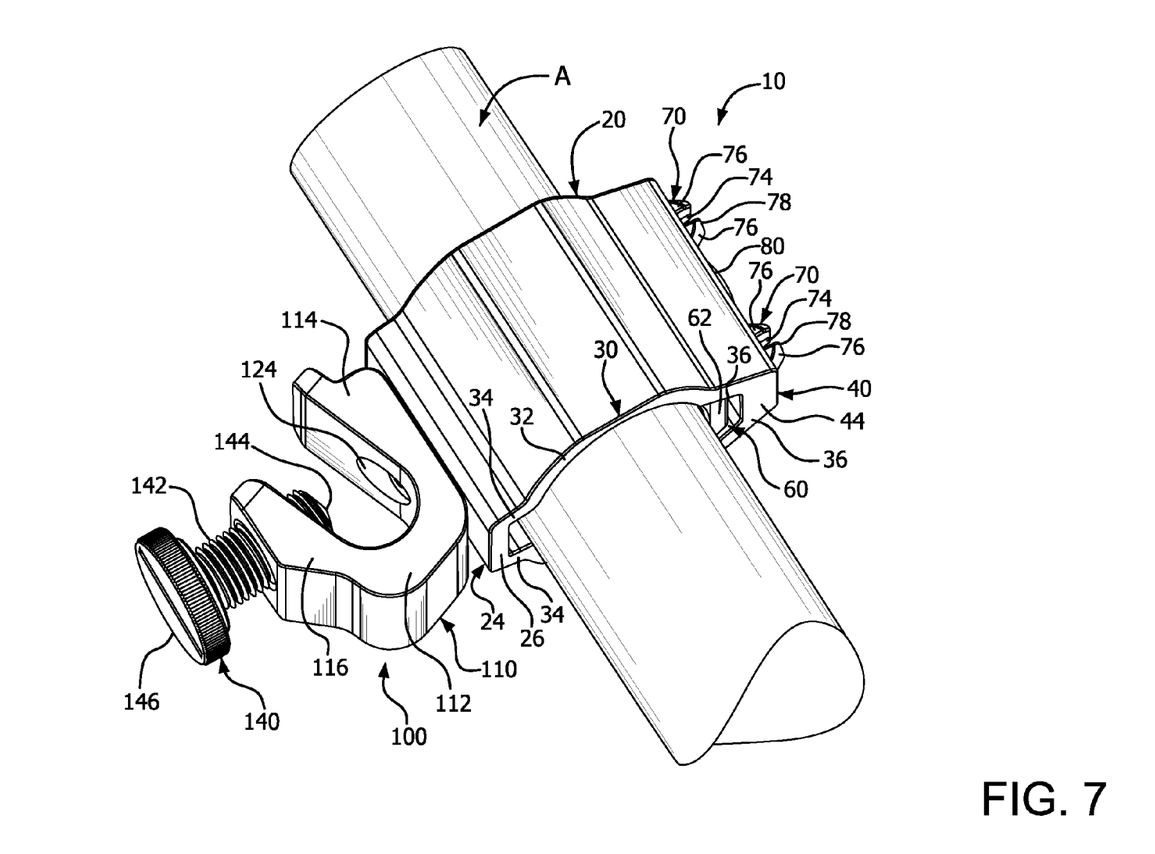
FIG. 7 is a perspective view of an embodiment of a force spreading clamp as in FIG. 1. showing a generally cylindrical object being retained by the clamp.

An embodiment of a force spreading clamp 10 is depicted in FIG. 1, and the clamp 10 is shown in use retaining a generally cylindrical object in FIG. 7. The clamp 10 includes a tubular body 20, a gate 60 configured to move radially inward and outward with respect to the tubular body 20, an actuator 80 for actuating the gate 60 with respect to the tubular body 20, and a mounting bracket 100 for attaching the clamp 10 to a mounting surface or another object. For example, mounting bracket 100 may be used to attach the clamp 10 to a helmet or other protective gear in military, firefighting, or recreational settings such as spelunking, where hands-free operation of a flashlight or other light is desired. Mounting bracket 100 may also be used to attach an object such as a flashlight to a stationary object such as a workbench or other work surface, to provide illumination while allowing both a user's hands remain free to manipulate tools or other objects.

Figure 2:
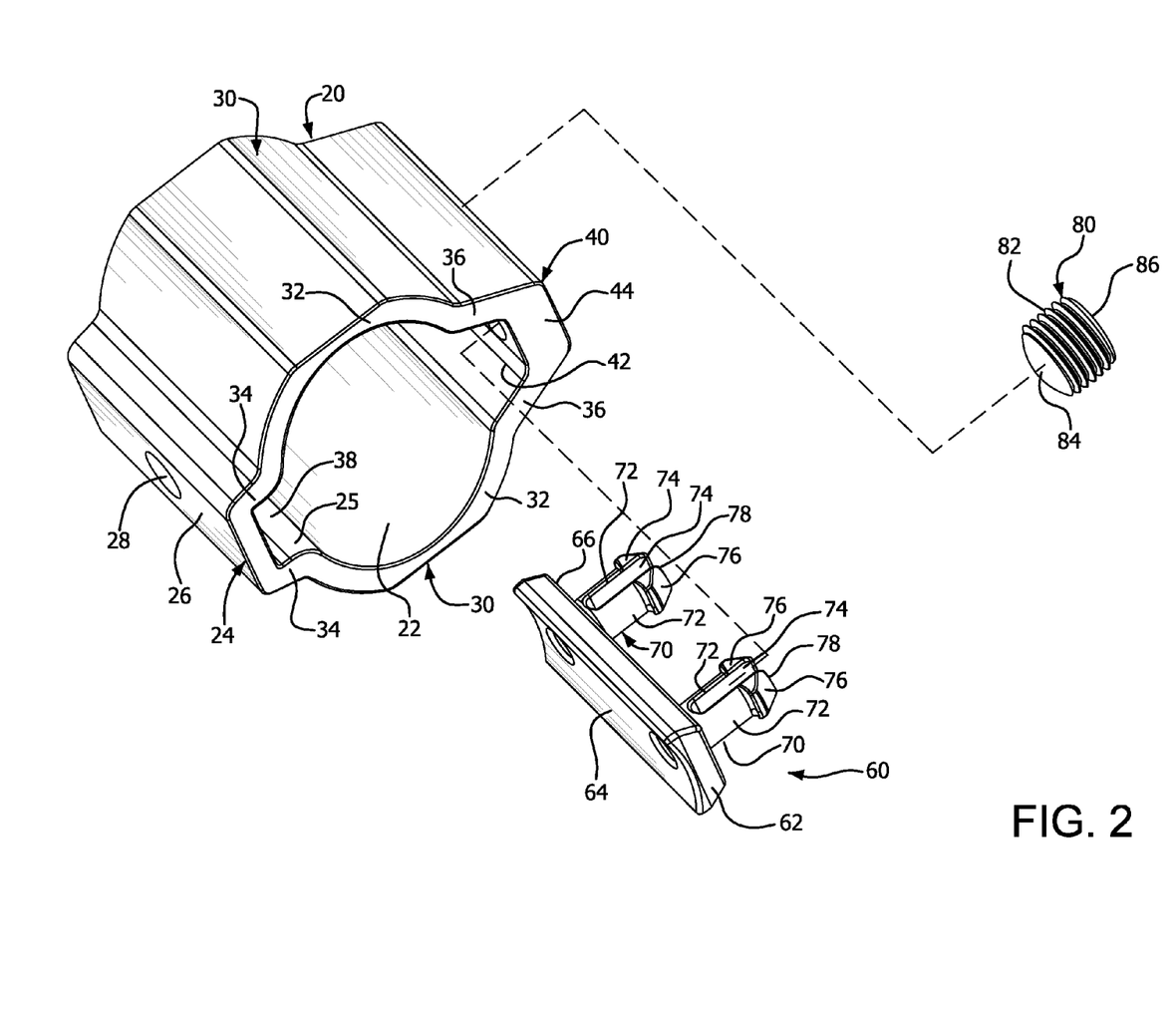
FIG. 2 is an exploded perspective view of a portion of a force spreading clamp as in FIG. 1.
Figure 3:
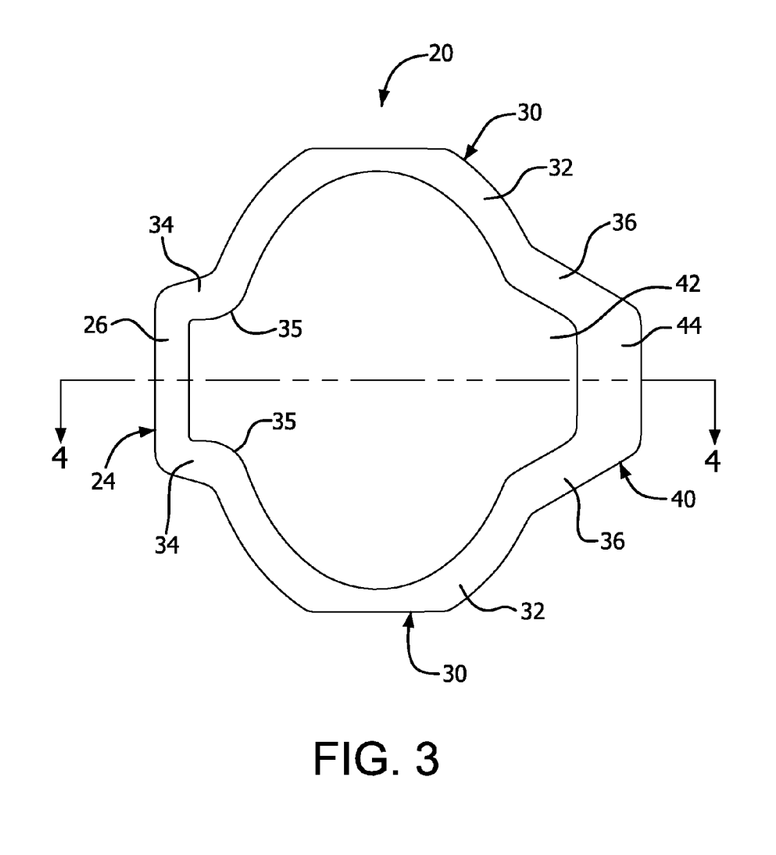
FIG. 3 is an end view of a tubular body for use in a force spreading clamp as in FIG. 1.
Figure 4:
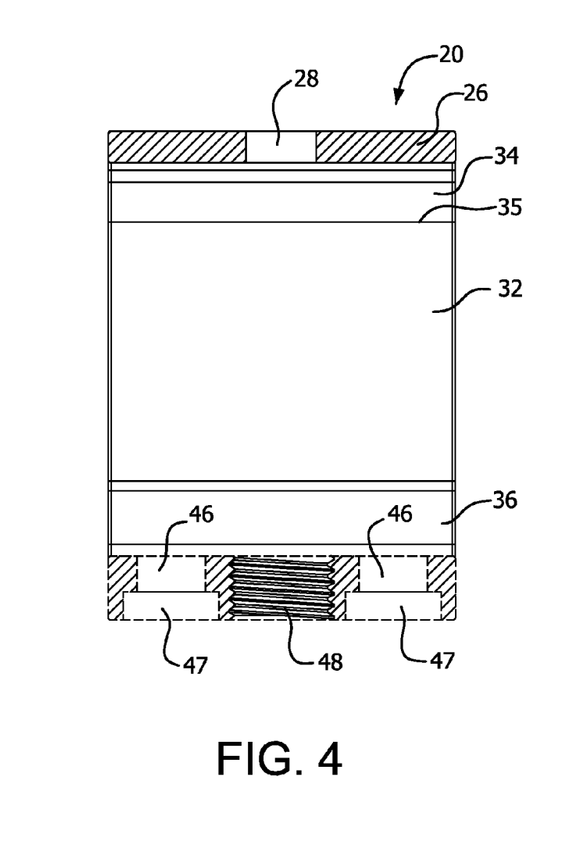
FIG. 4 is a cross-sectional view through section 4-4 of the tubular body of FIG. 3.
Figures 5A, 5B, 5C:
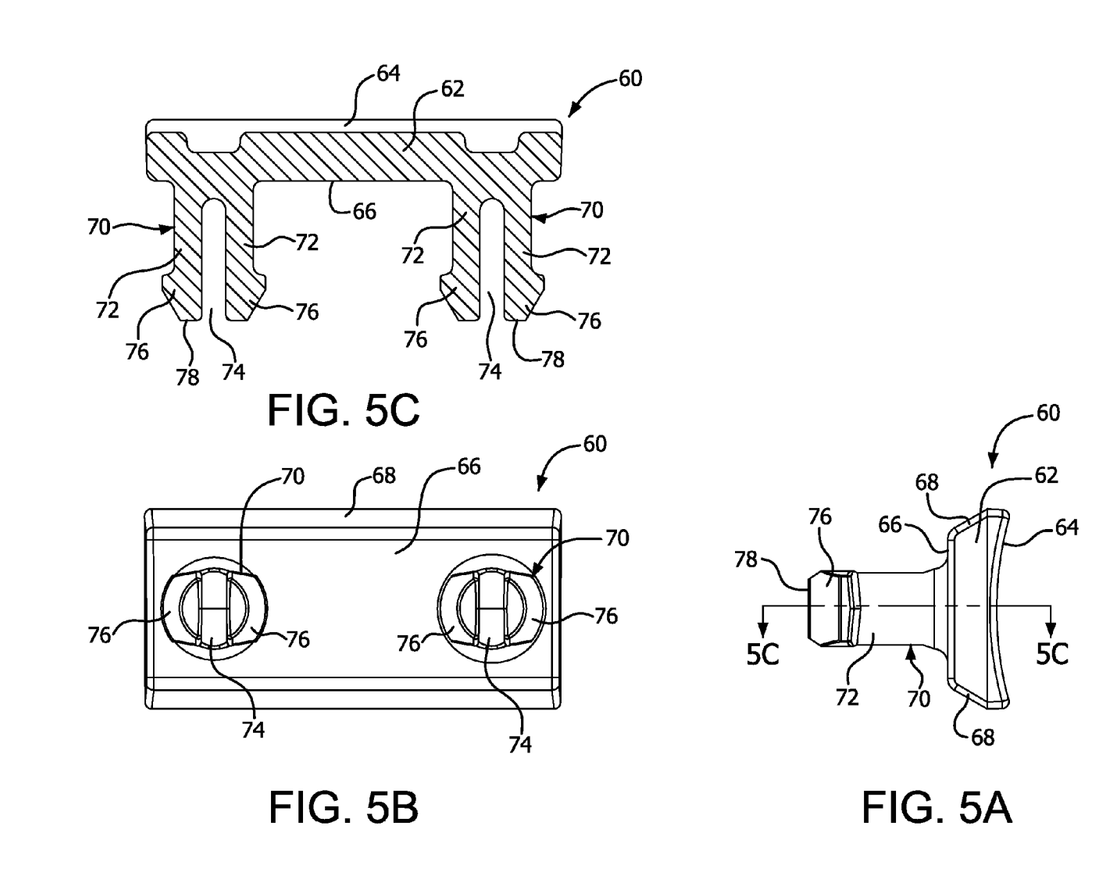
FIGS. 5A, 5B, and 5C are an end view, a top view, and a longitudinal cross-sectional view, respectively, of a gate for use in a force spreading clamp as in FIG. 1.

As shown in greater detail in FIGS. 2 through 4, the tubular body 20 includes a gate wall portion 40 and a mount wall portion 24 joined by a pair of side wall portions 30. Together, the wall portions 24, 30, and 40 define a tubular opening 22 that extends longitudinally through the tubular body 20. The tubular body 20 and the tubular opening 22 define an axis in the longitudinal direction. The tubular opening 22 is configured to receive at least a portion of a generally cylindrical object (not shown), such as a flashlight. It is understood that the term "generally cylindrical object" encompasses elongate objects having cross-sectional shapes that are circular in cross-section as well as noncircular, and which may have straight or tapered sides, including but not limited to cross-sections that are oval, octagonal, hexagonal, and other regular and irregular polygonal shapes that may fit into the tubular opening 22 in the tubular body 20.

As shown in greater detail in FIGS. 2, 5A, 5B, 5C, the gate 60 includes a clamping member 62 having an inner wall 64 and an outer wall 66. The inner wall 64 may be planar, or the inner wall 64 may also be shaped as desired to more uniformly contact and accommodate a convex, generally cylindrical object to be held by the clamp 10. The clamping member 62 may include chamfered sidewalls 68 to assist in guiding the movement of the gate 60 radially inwardly and outwardly with respect to the tubular body 20, as will he more fully described.

A guide mechanism helps to guide the gate 60 has it moves radially inward and outward with respect to the tubular body 20. In the depicted embodiment, the guide mechanism includes a pair of guide elements or pins 70 that extend outwardly from the outer wall 66 of the clamping member 62 and through a guide holes 46, described further below. Preferably, although not necessarily, the guide pin 70 is forked in shape, has a pair of tines 72 separated by a slot 74 that extends from a tip end 78 of the guide pin 70 to near the junction between the guide pin 70 and the outer wall 66. Each tine includes an enlarged head 76 at its tip end 78. The slot 74 enables the tines 72 to flex radially inwardly (i.e., into the slot 74) to enable the enlarged heads 76 to pass through a hole, and then to flex back radially outwardly (i.e., away from the slot 74) to inhibit reverse passage of the enlarged heads 76 back through a hole. However, the guide pins may be solid or forked into more than two tines, and may have any desired cross-sectional shape consistent with the shape of the guide holes 46 through which the pins extend. Alternatively, the guide mechanism may include only a single guide element, or three or more guide elements. Additionally, in place of an enlarged head, the guide element may be configured to be retained in the tubular body 20 by another mechanical means. For example, the guide element may include one or more circumferential grooves near its tip end for receiving an E-clip or the like, or a through hole for receiving a Kotter pin or the like.

In the illustrated embodiment of the tubular body 20, each side wall portion 30 includes a curved sidewall 32 bounded on one end by a mounting end leg 34 and on an opposite end by a gate end leg 36. While the illustrated embodiment shows the sidewalls 32 each being curved in a segment of an oval, including the major apex of the oval, the sidewalls 32 may be of any concave shape adapted to receive a generally cylindrical object, such as but not limited to an arc of a circle, a compound curve, and a portion of a regular or irregular polygonal shape.

A mounting end leg 34 is positioned on either side of the mounting wall portion 24 and is joined to the mounting wall portion 24 at an inwardly convex junction 35. The combination of the mounting wall portion 24 and the two mounting end legs 34 forms a mounting end recess 38 that extends the opening 22 in a radially outward direction. The presence of the mounting end recess 38, framed by the convex junctions 35, helps center a generally cylindrical object in the opening 22 since the object will contact the convex junctions 35 and protrude partially into the recess 38.

A gate end leg 36 is positioned on either side of the gate wall portion 40. The combination of the gate wall portion 40 and the two gate end legs 36 forms a gate recess 42 that extends the opening 22 in a radially outward direction. The gate recess 42 is configured to receive a clamping member 62 of the gate 60, when retracted, to maximize the size of the generally cylindrical object that can be received into the opening 22. The gate recess 42 may also assist in guiding the movement of the gate 60 radially inwardly and outwardly with respect to the body 20 by contacting the chamfered sidewalls 68 of the clamping member 62.

Although the gate wall portion 40 and the mounting wall portion 24 arc shown in the depicted embodiment as being diametrically opposed to each other, the gate wall portion and the mounting wall portion 24 may be positioned at any relative angular displacement about the circumference of the tubular body 20 that enables both the mounting bracket 100 and the actuator 80 to be accessed by a user.

The gate wall portion 40 includes a substantially planar gate wall 44 having two guide holes 46 and an actuator hole 48 extending therethrough. Each guide hole 46 is sized and shaped to accommodate a corresponding guide pin 70 extending from the clamping member 62 of the gate 60. As shown, each guide hole 46 may have an enlarged diameter countersink 47 for receiving the enlarged head 76 of the corresponding guide pin 70. In the illustrated embodiment, guide holes 46 are circular in cross-section, but could also be rectangular in cross-section, as long as the guide holes 46 are able to receive guide pins 70 and allow for reciprocal movement or the guide pins 70 in the guide holes 46.

The actuator hole 48 is configured for receiving an actuator 80. The actuator hole 48 may be internally threaded, as shown, for engagement with an externally threaded actuator 80. An exemplary actuator 80 is shown in FIG. 2 as a set screw having a threaded shank 82, a tip end 84 for contacting the outer wall 66 of the clamping member 62, and a head 86 preferably having a countersunk tool engagement mechanism (e.g., an Allen head fitting, a flat screw slot, a Phillips screw slot, a TORX® head, or the like). The threaded shank 82 engages the internally threaded actuator hole 48 such that rotation of the actuator 80 causes the actuator 80 to move along its axis within the actuator hole 48 in a radially inward and outward direction with respect to the tubular body 20.

Figure 8A:
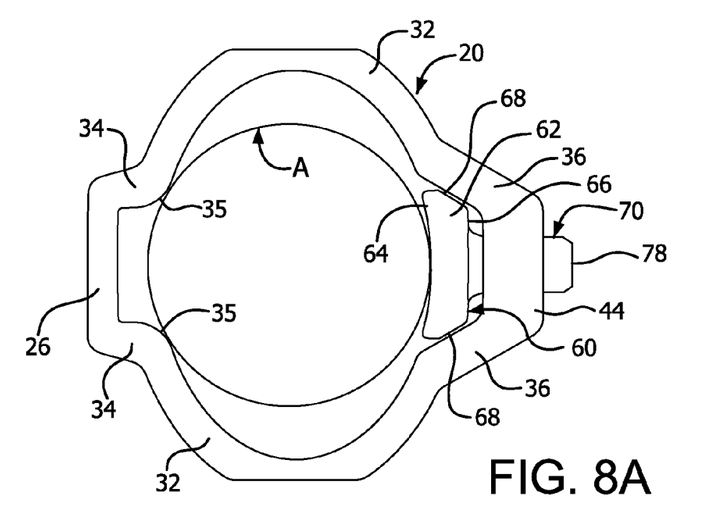
FIGS. 8A and 8B are end views of a portion of a force spreading claim as in FIG. 1 showing the ability of the clamp to retain differently sized generally cylindrical objects.
Figure 8B:
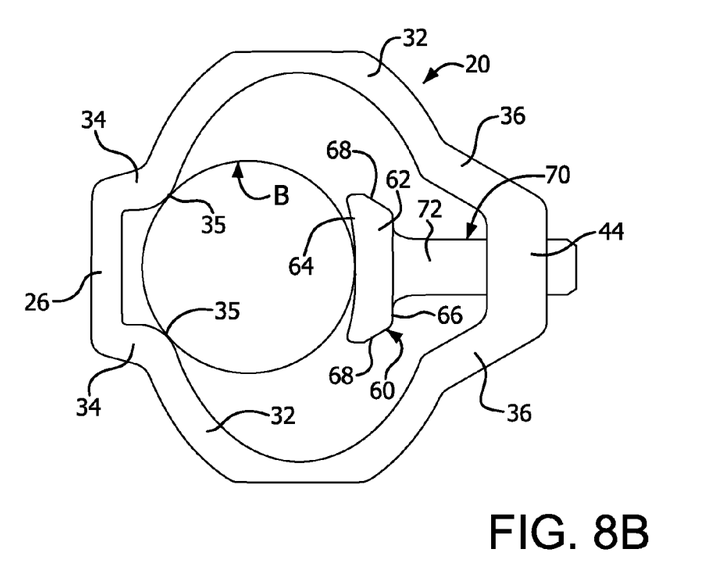

When the actuator 80 is rotated in a first direction, the actuator 80 moves radially inward to contact and push against the outer wall 66 of the clamping member 62, thereby causing the gate 60 to move radially inward with respect to the tubular body 20. The guide pins 70 move within the guide hole 46 to maintain alignment between the clamping member 62 and the tubular body 20. The interaction between the enlarged heads 76 of the guide pins 70 and the guide holes 46 also prevents the gate 60 from detaching from the tubular body 20 when no generally cylindrical object is present in the opening 22. As the gate 60 moves radially inward, the enlarged heads 76 of the guide pins 70 may become recessed within the countersinks 47 to enable a greater range of movement of the gate 60. When a generally cylindrical object is positioned within the opening 22 in the tubular body 20, the concave inner wall 64 of the clamping member 62 contacts and presses against a portion of an outer surface of the generally cylindrical object. As the actuator 80 is rotated further in the first direction, the contact force between the inner wall 64 and the generally cylindrical object increases sufficiently to be able to securely retain the generally cylindrical object within the opening 22. FIGS. 8A and 8B illustrate two differently sized generally cylindrical objects, respectively denoted as object A and object B, alternatively being retained within the opening 22 by the gate 60.

In operation, the clamping member 62 distributes the point force from the tip 84 of the actuator 80 over a much larger area via the concave inner wall 64. This enables a significant retaining force to be applied to the generally cylindrical object without marring or penetrating, or otherwise damaging, the outer surface of the generally cylindrical object. This is particularly important when retaining a generally cylindrical object, such as a flashlight, that is made from a plastic or other material that is considerably softer than the material of the actuator 80. Preferably, the length of the gate can be chosen to spread the clamping force over an area large enough that penetration of or damage to the body of the light is avoided. The clamping member 62 may be shorter or longer than the tubular body 20 itself.

Figure 9:
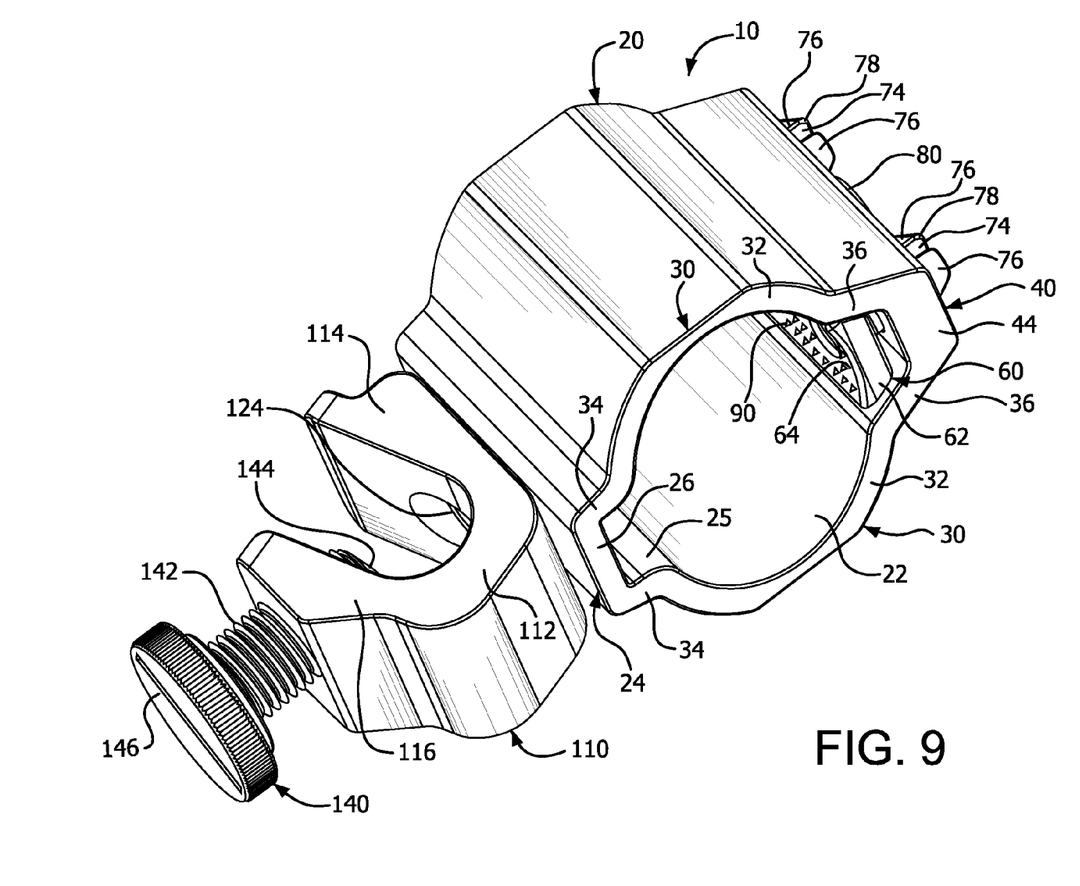
FIG. 9 is a perspective view of another embodiment of a force spreading clamp liar securing a generally cylindrical object to a mounting surface or another object.

The inner wall 64 of the clamping member 62 may be generally smooth, as in the embodiment of FIG. 1, or textured, as in the embodiment of FIG. 9. In one embodiment, the inner wall 64 is textured with a plurality of small raised hemispherical projections extending outwardly from the inner wall 64. In another embodiment, the inner wall 64 is textured with transverse ribs running perpendicular to the axis of the tubular body 20. In yet another embodiment, the inner wall 64 is textured with dimples extending into the contact wall 64. In still another embodiment, the inner wall 64 could be structured to mate with an outer surface of the generally cylindrical object to be retained, for example the outer surface of a flashlight may have circumferential or longitudinal ridges, and the inner wall 64 of the clamping member 62, as well as the inner surface of the tubular body 20, could include mating ridges to essentially lock the flashlight into position.

When the actuator 80 is rotated in a second direction opposite to the first direction, the actuator 80 moves outwardly to reduce the contact force between the inner wall 64 of the clamping member 62 and the outer surface of the generally cylindrical object.

When the contact force has been sufficiently decreased, the generally cylindrical object can be removed from the opening 22 in the tubular body 20.

The mounting wall portion 24 includes a substantially planar mounting wall 26 having a mounting hole 28 therethrough. The mounting wall 26 provides a contact surface for supporting a mounting bracket, such as the mounting bracket 100, and the mounting hole 28. can be used to secure a mounting bracket to the tubular body 20.

Figure 6:
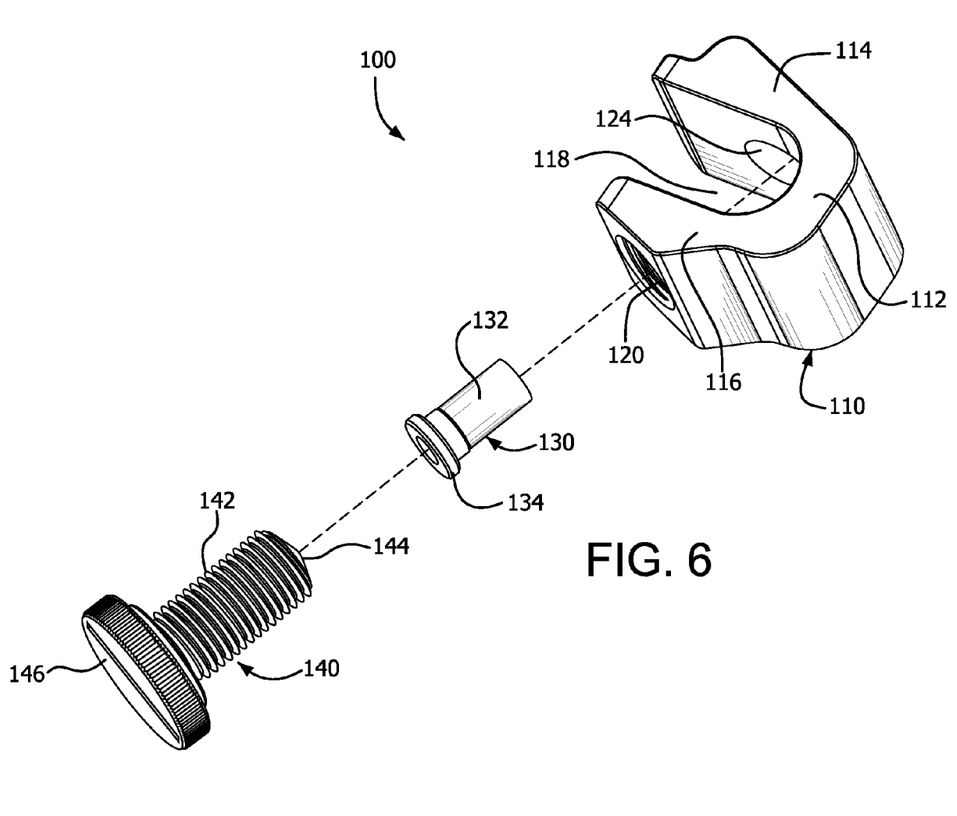
FIG. 6 is an exploded view of a mounting bracket for use in a force spreading clamp as in FIG. 1.

In the embodiment depicted in FIGS. 1 and 6, the mounting bracket 100 includes a U-shaped portion 112, an inner leg 114 depending from one side of the U-shaped portion 112, and an outer leg 116 depending from an opposite side of the U-shaped portion 112. A slot 118 is formed between the inner leg 114 and the outer leg 116 for receiving a mounting surface. Various other mounting brackets, existing or not yet developed, may be employed in combination with the clamp 10 to enable attachment of a generally cylindrical object to virtually any of a wide variety of mounting surfaces. For example, various helmet mounting brackets exist and can be devised for use with particular helmets, including but not limited to those used by firefighters, rescue workers, and spelunkers. Further, brackets exist and can be devised, for example, to secure the clamp to a firearm.

The inner leg 114 includes a slotted hole 124 to attaching the bracket 100 to the tubular body 20. For example, as shown, a rivet 130 may be provided having a body 132 adapted to fit through the holes 124 and 28, and an enlarged head 134 too large to fit through the hole 124. When the rivet body 132 is crimped inside the tubular body 20, the rivet 130 secures the bracket 100 to the tubular body 20. The outer leg 116 includes an internally threaded hole 120 for receiving a set screw 140, the set screw having a threaded shank 142, a tip 144, and a head 146. When a mounting surface (not shown), such as the brim of a hardhat, is inserted into the slot 118, the set screw 140 may be tightened by rotation in a first direction to cause the tip 144 to contact the mounting surface, thereby retaining the mounting surface in the slot 118. The mounting surface may be removed by loosening the set screw 140 by rotation in a second direction to release the tip 144 from the mounting surface, and then sliding the mounting surface out of the slot 118.

The tubular body 20 and the gate 60 may be made from any material that has sufficient structural rigidity to securely clamp a generally cylindrical object but also is sufficiently pliable so as not to damage the outer surface of the generally cylindrical object. In addition, the tubular body 20 and the gate 60 may be made from the same or different materials. For example, one or both of the tubular body 20 and the gate 60 may be made from a metal, including but not limited to aluminum, or from a polymeric material, such as a thermoplastic. Alternatively, materials such as carbon fiber composites or other resin-based materials may be used. Other materials, consistent with the object of avoiding damage to objects being clamped, may also be used.

While the force spreading clamp has been illustrated and described with reference to certain preferred embodiments, numerous modifications, alterations, and changes to the described embodiments are possible without departing from the sphere and scope of the invention, as defined in the appended claims and equivalents thereof.

The invention claimed is:

1. A force-spreading clamp comprising:
   a tubular body having a longitudinal opening for receiving at least a portion of a generally cylindrical object and a wall encircling the longitudinal opening, the wall including a gate wall portion having guide holes and a mounting wall portion, the gate wall portion and the mounting wall portion being joined by a pair of side portions, the gate wall portion surrounding a recess in the longitudinal opening;
   a gate including a longitudinal clamping member having an outer wall and an inner contact wall for distributing clamping force along an outer surface of the generally cylindrical object so as to inhibit damage to the object, the gate being movable with respect to the body to enable the clamping member to be extended radially inward into the longitudinally opening and to be retracted radially outwardly to be positioned at least partially within the recess in the longitudinal opening, the gate further including a pair of guide elements protruding from the outer wall of the clamping member and extending through the guide holes in the gate wall portion to maintain alignment between the gate and the tubular body as the gate is moved radially inwardly and outwardly, each guide element including a pair of tines separated by a longitudinal slot, each tine having a shank protruding from the clamping member and a tapered enlarged head distal from the clamping member to facilitate installation of each guide element into and to inhibit removal of each guide element from a corresponding guide hole; and
   an actuator threadingly engaging the gate wall portion of the tubular body wall such that rotating the actuator in a first direction with respect to the tubular body actuates the gate in a radially inward direction from the tubular body wall to cause the clamping member to increase a clamping force applied to the generally cylindrical object and rotating the actuator in a second direction causes the clamping member to decrease the clamping force applied to the generally cylindrical object.

2. The clamp of claim 1, wherein the inner contact wall has a concave shape.

3. The clamp of claim 1, wherein the inner contact wall has a textured surface for enhancing the grip of the clamp on the generally cylindrical object.

4. The clamp of claim 3, wherein the textured surface includes raised projections.

5. The clamp of claim 3, wherein the textured surface includes ribs.

6. The clamp of claim 1, wherein the actuator is a set screw.

7. The clamp of claim 1, further comprising:
   a mounting bracket joined to the mounting wall portion of the tubular body wall for mounting the clamp to a mounting surface.

8. A force-spreading clamp comprising:
   a tubular body having a longitudinal opening for receiving at least a portion of a generally cylindrical object and a wall encircling the longitudinal opening;
   a gate including a clamping member positioned within the longitudinal opening and having a contact wall for distributing clamping force along a surface of the generally cylindrical object;
   a guide mechanism being configured to maintain alignment between the gate and the tubular body as the gate moves radially inward and outward with respect to the tubular body, the guide mechanism including a pair of tines separated by a longitudinal slot, each tine having a shank protruding from the clamping member and a tapered enlarged head distal from the clamping member to facilitate installation of the tines into and to inhibit removal of the tines from corresponding guide holes in the wall of the tubular body; and
   an actuator configured to actuate the gate in a radially inward direction with respect to the tubular body wall to cause the clamping member to apply clamping force to the generally cylindrical object.

9. The clamp of claim 8, wherein the guide mechanism includes a recessed cavity formed by a portion of the wall encircling the longitudinal opening for receiving the clamping member of the gate and chamfered sidewalls formed on the clamping member for engaging the portion of the wall forming the recessed cavity.

10. The clamp of claim 8, wherein the guide mechanism includes a pair of guide holes extending through the wall of the body and a pair of guide elements protruding from an outer wall of the clamping member and through the guide holes, the outer wall being opposite the contact wall of the clamping member.

11. The clamp of claim 8, wherein the contact wall has a concave shape.

12. The clamp of claim 8, wherein the contact wall has a textured surface for enhancing the grip of the clamp on the generally cylindrical object.

13. The clamp of claim 12, wherein the textured surface includes raised projections.

14. The clamp of claim 12, wherein the textured surface includes ribs.

15. A force-spreading clamp for retaining a generally cylindrical object, comprising:
   a body having an axial opening therethrough for receiving at least a portion of a generally cylindrical object;
   a movable gate element extending radially into the opening and having a contact face and a force-receiving face opposite the contact face, the gate element being movable toward and away from the longitudinal axis of the opening;
   at least one guide element extending from the force-receiving face of the contact element and through a guide hole in the body, the at least one guide element including a pair of tines separated by a longitudinal slot, each tine having a shank protruding from the movable gate element and a tapered enlarged head distal from the movable gate element to facilitate installation of the guide element into and to inhibit removal of the guide element from a corresponding guide hole in a wall of the body; and
   a set screw threadingly engaging the body and having a first end contacting the force-receiving face of the contact element and being operative to regulate movement of the engaging element toward and away from a longitudinal axis of the body, whereby rotation of the set screw in a first rotational sense causes the contact element to contact and apply clamping force to the generally cylindrical object in the opening to retain the object in the body, the clamping pressure being approximately evenly distributed across the surface area of the contact face.

* * * * *